United States Patent
Hammer et al.

(10) Patent No.: US 7,510,119 B2
(45) Date of Patent: *Mar. 31, 2009

(54) APPARATUS FOR ROTATING A MIRRORED SPINNER

(75) Inventors: Steven J. Hammer, Lilburn, GA (US); Wayne L. Orwig, Dacula, GA (US)

(73) Assignee: NCR Corporation, Dayton, OH (US)

( * ) Notice: Subject to any disclaimer, the term of this patent is extended or adjusted under 35 U.S.C. 154(b) by 565 days.

This patent is subject to a terminal disclaimer.

(21) Appl. No.: 11/175,492

(22) Filed: Jul. 6, 2005

(65) Prior Publication Data

US 2007/0007352 A1 Jan. 11, 2007

(51) Int. Cl.
*G06K 7/1011* (2006.01)

(52) U.S. Cl. .............................. 235/462.38; 235/472.01
(58) Field of Classification Search ..................
235/462.01–462.45, 472.01–472.3, 470
See application file for complete search history.

(56) References Cited

U.S. PATENT DOCUMENTS

| 4,941,739 | A | * | 7/1990 | Grudic et al. ............... 359/223 |
| 5,663,550 | A | | 9/1997 | Peng |
| 7,316,356 | B2 | * | 1/2008 | Minter et al. .......... 235/462.36 |

* cited by examiner

*Primary Examiner*—Thien M Le
(74) *Attorney, Agent, or Firm*—Paul W. Martin

(57) ABSTRACT

An apparatus for rotating a mirrored spinner about multiple axes. The apparatus includes a first axle which rotates about a first axis of rotation, and a second axle for mounting the mirrored spinner to the first axle, wherein the second axle rotates the mirrored spinner about a second axis of rotation.

1 Claim, 6 Drawing Sheets

APPARATUS FOR ROTATING A MIRRORED SPINNER

BACKGROUND

Optical bar code scanners typically include a mirrored spinner. It would be desirable to provide an apparatus for rotating a mirrored spinner.

SUMMARY

An apparatus for rotating a mirrored spinner is provided.

The apparatus includes a first axle which rotates about a first axis of rotation, and a second axle for mounting the mirrored spinner to the first axle, wherein the second axle rotates the mirrored spinner about a second axis of rotation.

DETAILED DESCRIPTION

Figure 1:
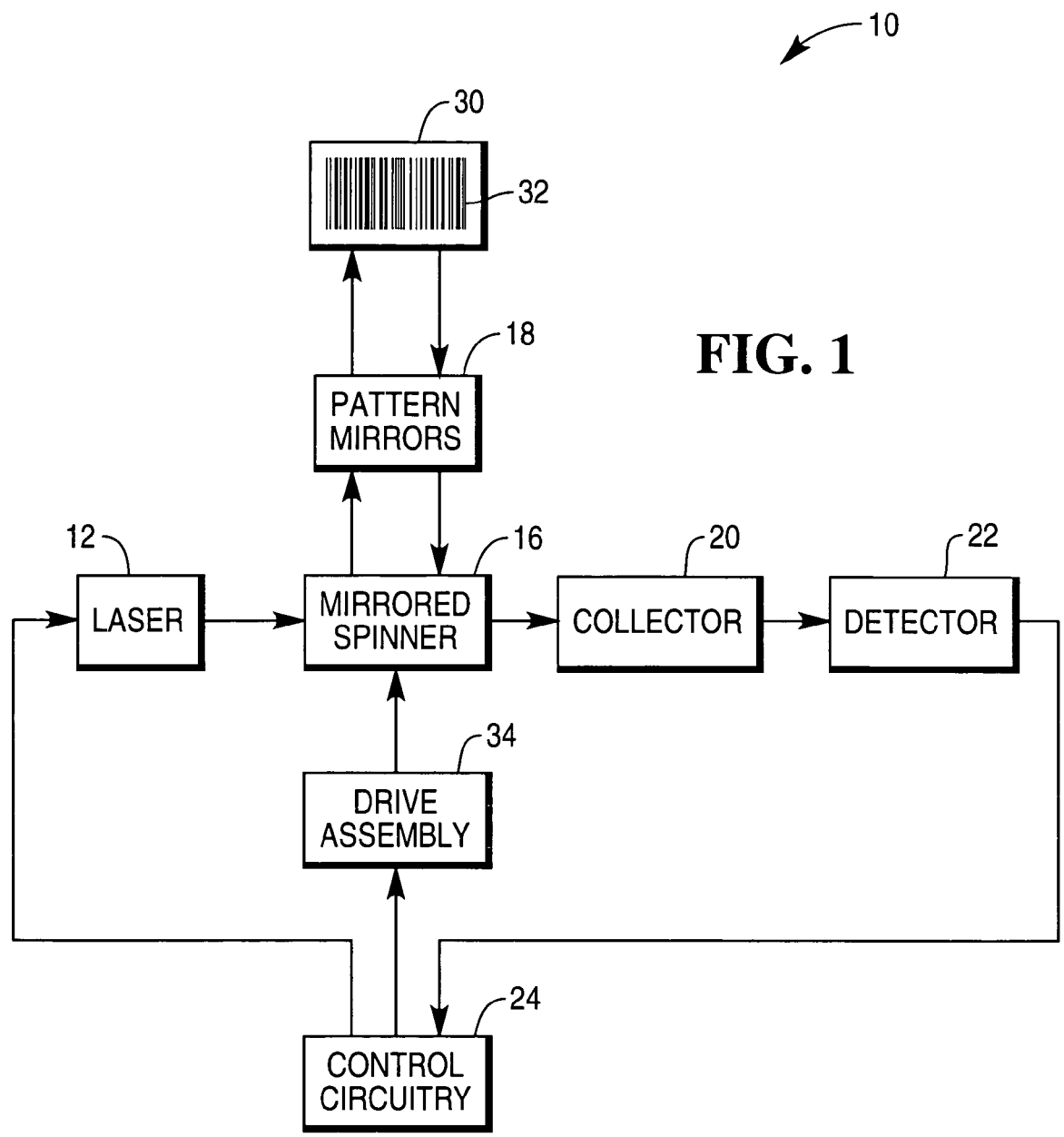
FIG. 1 is a block diagram of a bar code scanner.
Figure 2:
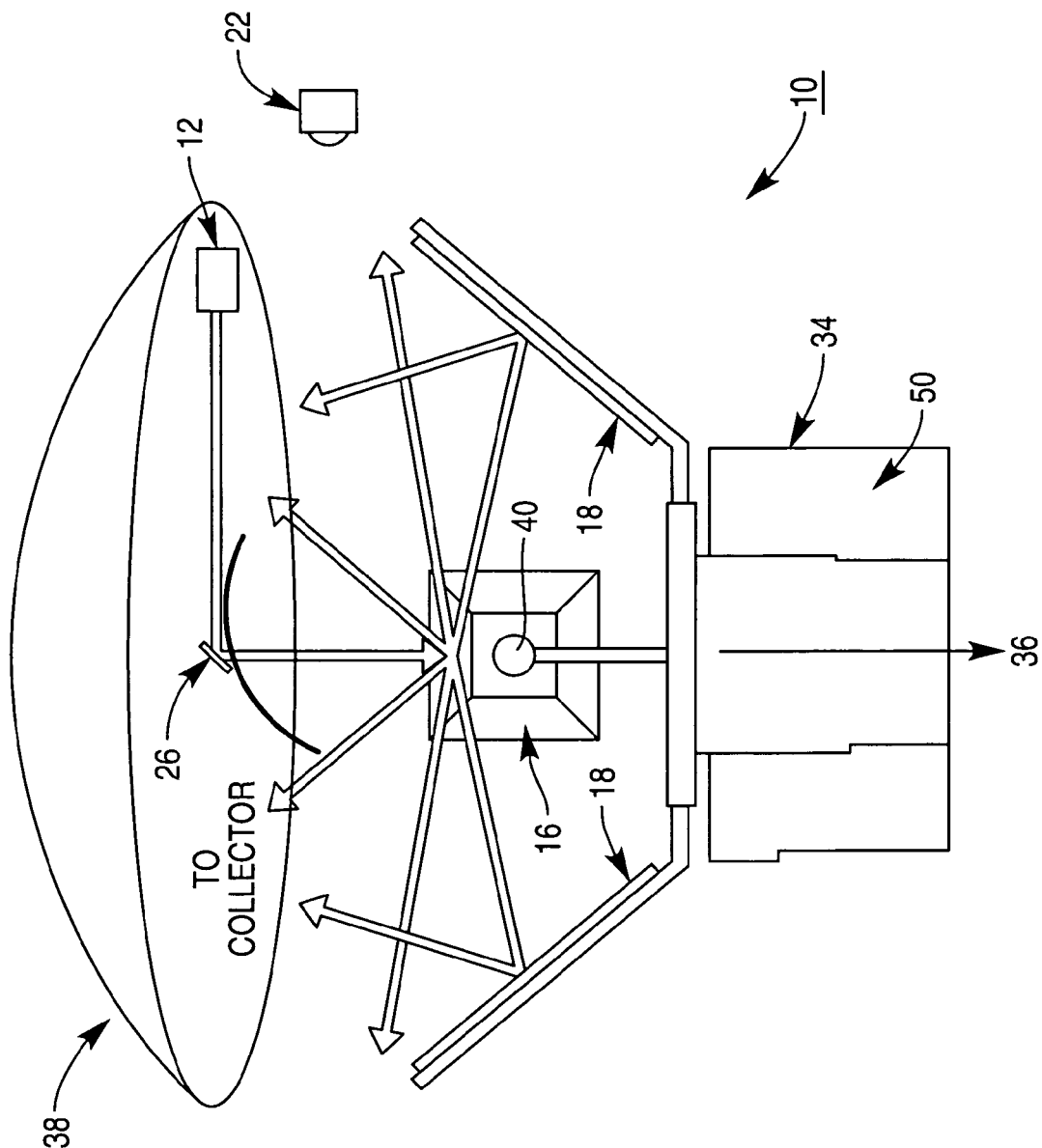
FIG. 2 is a view of an example bar code scanner.

With reference to FIGS. 1 and 2, an example bar code scanner 10 includes laser 12, mirrored spinner 16, pattern mirrors 18, collector 20, detector 22, and control circuitry 24.

Laser 12 produces a laser beam. Mirror flat 26 (FIG. 2) directs the laser beam towards mirrored spinner 16.

Mirrored spinner 16 directs the laser beam to pattern mirrors 18. Mirrored spinner 16 further directs light reflected from item 30 to collector 20. Mirrored spinner 16 is rotated by drive assembly 34. Mirrored spinner 16 is shown with may have any number of mirrored facets. Four facets are illustrated in FIG. 1.

Mirrored spinner 16 and drive assembly 34 form a scan engine having two axes 36 and 40 of rotation to essentially rotate scan volume 38 about axis 36 (FIG. 2). The scan engine produces a hemispherical shaped scan volume 38, which is larger than a comparable wedge shaped scan volume of a conventional single axis scan engine. In one embodiment, first axis 36 is substantially orthogonal to second axis 40, however, other angles between axes 36 and 40 are also envisioned.

First axis 36 is rotated by motor 50. In an example embodiment, motor rotates first axis 36 as high as about 1200 RPM. Drive assembly 34 produces an example speed of rotation about second axis 40 of as high as about 19,200 RPM (16:1 ratio). Other speeds are envisioned as motor technology improves.

Pattern mirrors 18 produce scanning light beams for scanning bar code 32 on item 30. Pattern mirrors 18 further collect light reflected from item 30 and direct the reflected light to mirrored spinner 16.

Collector 20 collects the reflected light from mirrored spinner 16.

Detector 22 converts the reflected light into electrical signals based upon the intensity of the reflected light.

Control circuitry 24 controls operation of laser 12 and motor 34 and decodes bar code information contained within the electrical signals received from detector 22.

Figure 3A:
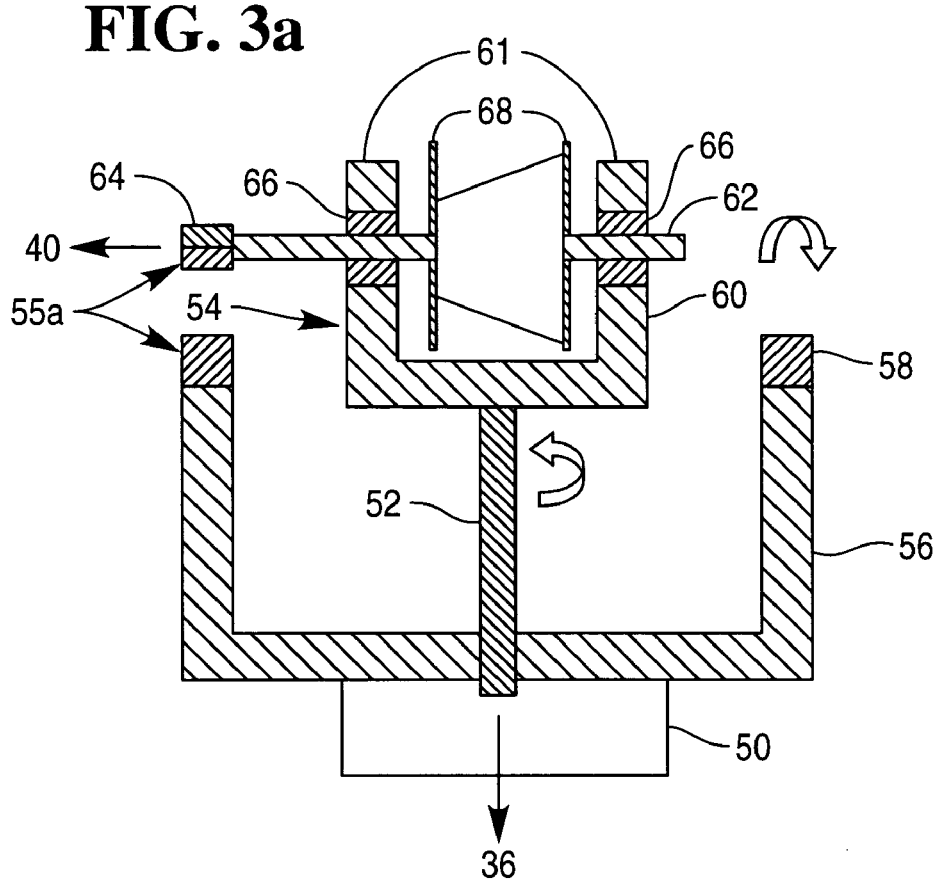
FIGS. 3a-c are views of an example scan engine.
Figure 3C:
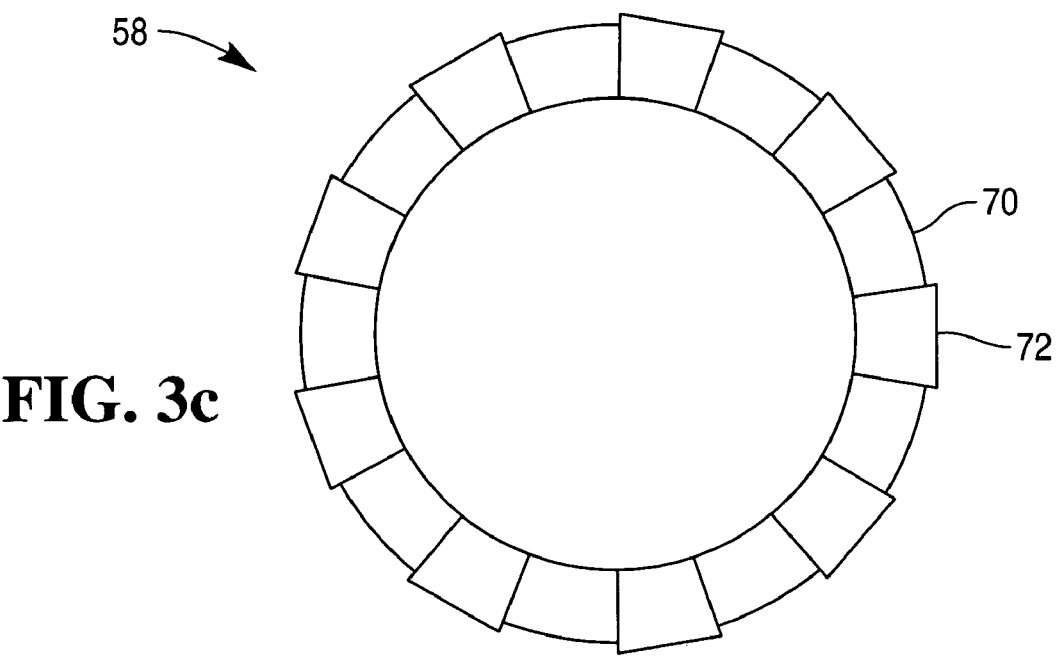
Figure 3B:
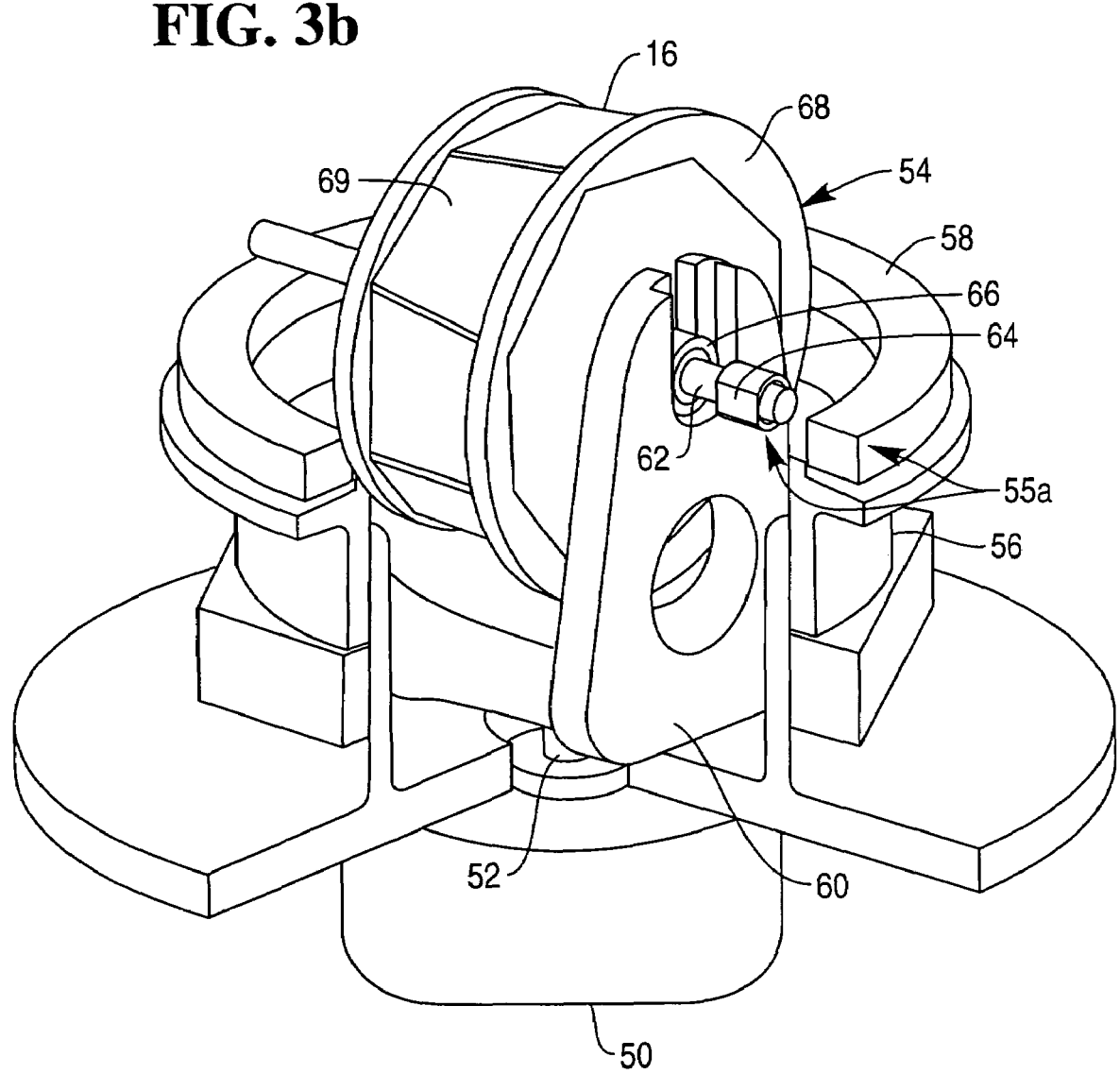

With reference to FIGS. 3a and 3b, an example embodiment of drive assembly 34 is illustrated.

With reference to FIGS. 3a-c, drive assembly 34 includes motor 50, shaft 52, spinner assembly 54, and spinner rotation mechanism 55.

Motor 50 is mounted in stationary fashion and rotates shaft 52.

Shaft 52 rotates spinner assembly 54 about axis 36.

Spinner assembly 54 includes yoke 60, axle 62, bearings 66, balance plates 68, and facets 69.

Yoke 60 attaches to and rotates with shaft 52. Opposite arms 61 of yoke 52 retain axle 62.

Axle 62 rotates about axis 40. Mirrored spinner 16 rotates with axle 62.

Bearings 66 are located in yoke 60. Shaft 52 rides on bearings 66.

Balance plates 68 balance rotation of mirrored spinner 16.

Facets 69 are mirrored to reflect scanning light beams and reflected light. The orientations of facets 69 vary around spinner 16 so as to direct the scanning light beams in various directions. Eight facets 69 are shown in FIG. 3b.

Spinner rotation mechanism 55 includes cylinder 56, magnet 64, and ring of magnets 58.

Cylinder 56 is mounted in stationary fashion about axis 36.

Ring of magnets 58 is mounted to cylinder 56.

Magnet 64 is mounted to axle 62 and interacts with ring of magnets 58 to rotate axle 62 as yoke 60 rotates with shaft 52. In this embodiment, magnet 64 is mounted with the poles perpendicular to axle 62. Other configurations and angles are also envisioned. For example, axle 62 may be extended and another magnet 64 may be mounted to an opposite end of axle 62 from the other.

With reference to FIG. 3c, north and south magnets 70 and 72 alternate around ring of magnets 58. Other configurations of magnets 70 and 72 are also envisioned.

As motor shaft 52 rotates spinner assembly 54, attractive and repulsive forces from ring of magnets 58 act on magnet 64 on axle 62 to cause rotational torque on axle 62. In one example, ring of magnets includes nine pairs of north-south magnets 70 and 72, and each pair of north-south magnets 70 and 72 causes one revolution of axle 62, resulting in a spinner rotational speed about 9 times faster than the rotational speed of shaft 52.

Figure 4:
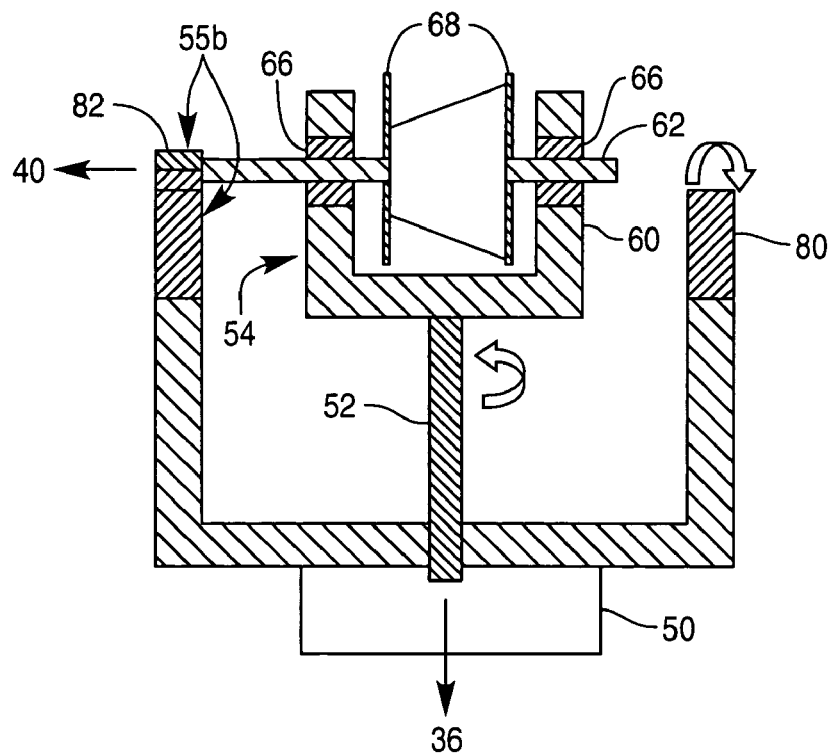
FIGS. 4-6 are views of additional examples of scan engines.

With reference to FIG. 4, an alternate embodiment includes driver mechanism 55b which relies on friction or gear teeth to rotate mirrored spinner 16. Instead of ring of magnets 58, cylinder 56 includes a friction pad or gear teeth ring 80. A friction embodiment envisions friction pad 80 interacting with axle 62 through friction to rotate axle 62. A gear embodiment envisions gear teeth ring 80 interacting with axle 62 through gear 82 to rotate axle 62.

Figure 5:
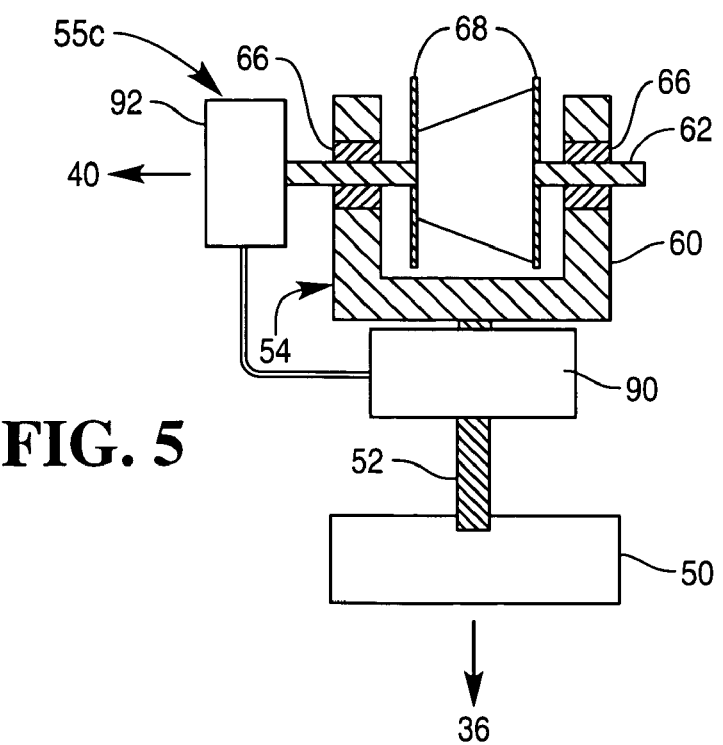

With reference to FIG. 5, an alternate embodiment includes drive rotation mechanism 55c which relies on a second motor 92. In one embodiment, second motor 52 receives electrical power through slip ring 90 which frictionally contacts stationary electrical terminals as it rotates about axis 36. In other alternative embodiments, power to second motor 92 may be provided through conductive bearings, a battery, a capacitor, a solar cell, or a fuel cell as part of spinner assembly 54.

Figure 6:
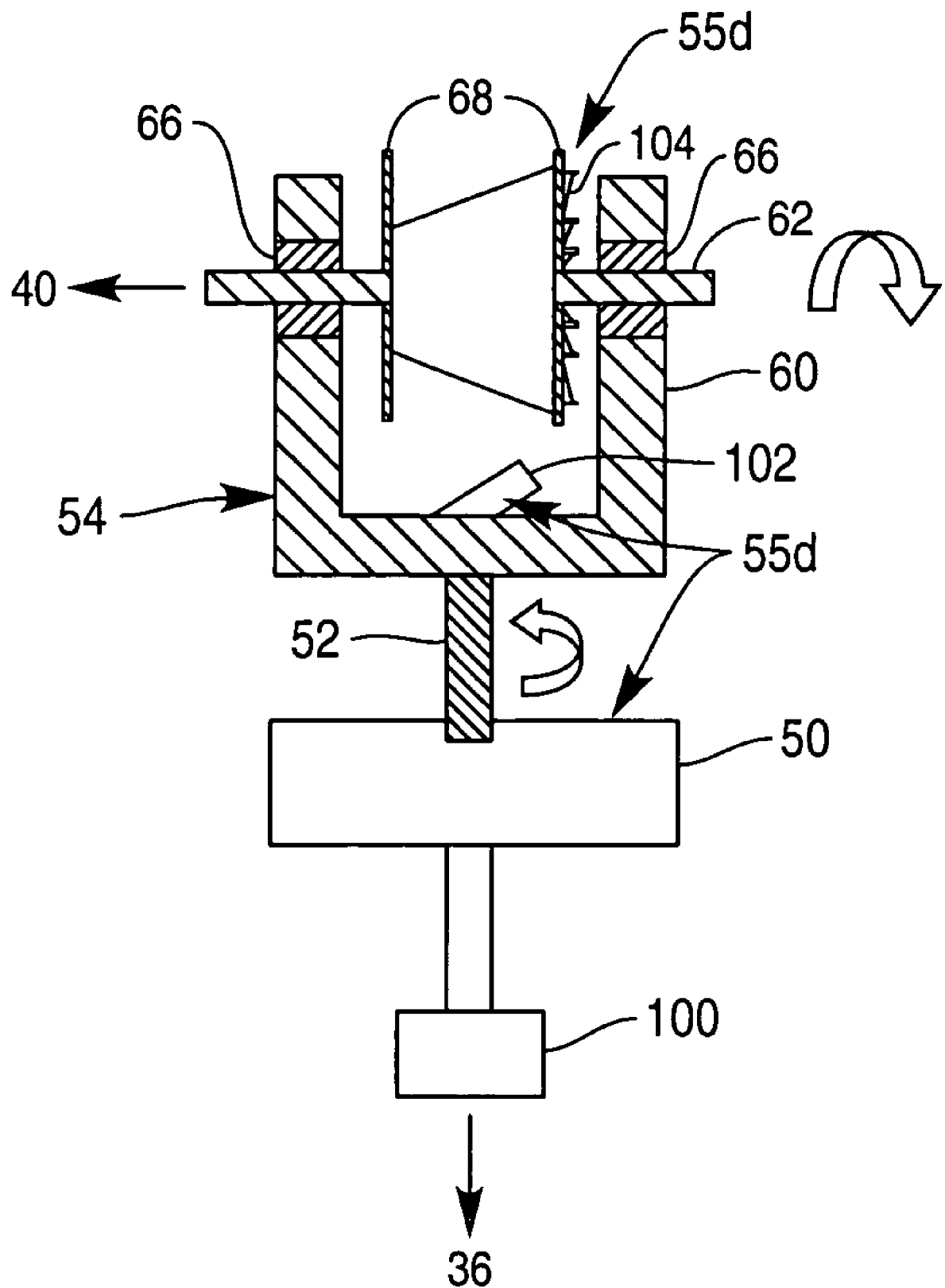

With reference to FIG. 6, an alternate embodiment includes drive rotation mechanism 55d which relies on pressurized air to rotate mirrored spinner 16. Drive rotation mechanism 55d includes pressurized air source 100, nozzle 102, and fan blades 104. Pressurized air source 100 is delivered through motor shaft 52 and rotating nozzle 102. Nozzle 102 directs pressurized air at fan blades 104 arranged around one of balance plates 68. Nozzle 102 rotates on hollow slow motor shaft 52 so it always stays aligned with spinner 16.

Although particular reference has been made to certain embodiments, variations and modifications are also envisioned within the spirit and scope of the following claims.

The invention claimed is:

1. A bar code scanner comprising:

a laser for producing a laser beam;

a mirrored spinner for directing the laser beam to produce scanning light beams for scanning a barcode of an item, wherein the mirrored spinner includes a plurality of facets having different orientations for directing the laser beam in different directions, and wherein the mirrored spinner produces a hemispherical scan volume; and an apparatus for rotating the mirrored spinner including a motor including a shaft which rotates about a first axis of rotation;

a spinner mount coupled to the shaft and including an axle coupled to the mirrored spinner for rotating the mirrored spinner about a second axis of rotation; and balance plates on the axle;

a collector for collecting light reflected from the item containing information about the barcode;

a detector for converting the light into electrical signals; and barcode decoding circuitry for obtaining the barcode information from the electrical signals.

* * * * *